Feb. 28, 1933.  S. W. RUSHMORE  1,899,398
HYDRAULIC BRAKE
Original Filed Aug. 17, 1927
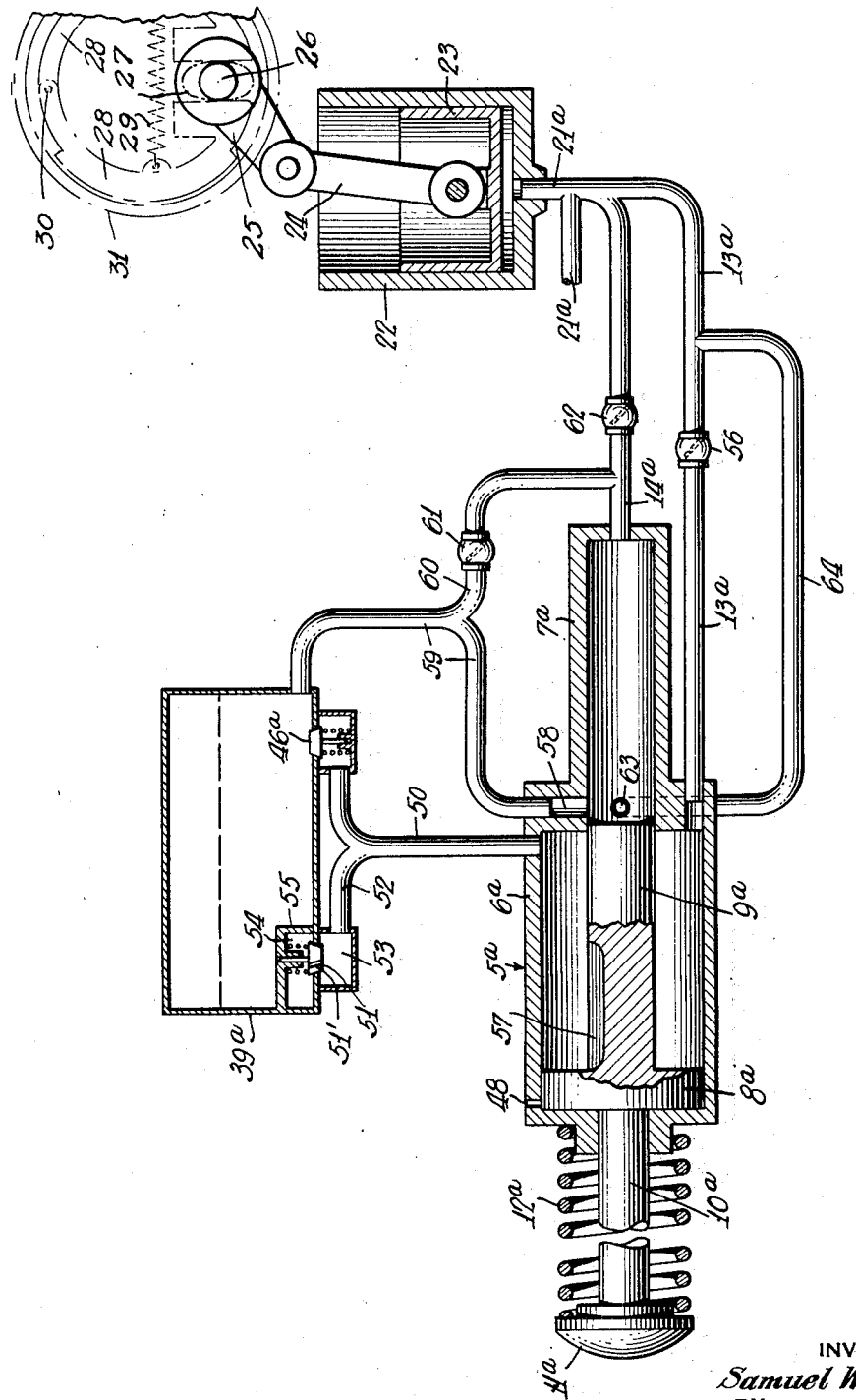
INVENTOR
Samuel W. Rushmore
BY
George C. Shoun
ATTORNEY Patented Feb. 28, 1933

1,899,398

UNITED STATES PATENT OFFICE

SAMUEL W. RUSHMORE, OF PLAINFIELD, NEW JERSEY

HYDRAULIC BRAKE

Original application filed August 17, 1927, Serial No. 213,490. Divided and this application filed November 29, 1930. Serial No. 498,942.

My present invention is related to that set forth in my Patent No. 1,786,633 granted December 30, 1930, on my application Ser. No. 213,490, filed August 17, 1927, of which this is a division. As in the prior case, the invention is shown as embodied in hydraulic braking mechanism, particularly adapted for use on vehicles such as automobiles, but it will be evident that certain of its novel features are applicable for other purposes and that the power transmitting medium may be and preferably is a fluid other than water.

In the hydraulic braking systems now commonly used on automobiles, a foot actuated plunger applies the pressure which is transmitted through oil in a conduit, to a motor cylinder that directly actuates the braking mechanism. The practically permissible length of stroke of this foot plunger is short and its diameter is necessarily small as compared with the diameter of the motor cylinder, to give a pressure multiplying ratio great enough for the purpose in view. Consequently, even a full stroke of the relatively small primary cylinder or pressure pump, can supply oil to the relatively large motor cylinder in quantity only sufficient for a relatively short stroke of the latter. Under the most favorable conditions, this is barely sufficient for proper clearance to prevent dragging of the brake shoes during normal running and as a consequence most of the stroke of the foot plunger is used in taking up the clearance and very little is left for applying the brakes. Consequently, the adjustment has to be extremely close and even a little wear or stretching will render the system inoperative.

An object of the present invention is to provide comparatively large capacity, low pressure means to do the light work of bringing the brake shoes to operating position, by a part of the stroke of the foot plunger and subsequently as the brake shoes come in contact with the brake drums on the wheels, have the remainder of the stroke, available for the heavy-pressure, small-movement work of actually braking the car.

To this end, I provide a pump which may include a low pressure cylinder and a high pressure cylinder which may be arranged in alignment with each other and operable by a single pedal; the low pressure cylinder being of comparatively large capacity so as to quickly charge the cylinders of the brake operating means and operate them to moderately apply the brakes; the high pressure cylinder being effective to apply the brakes under heavy pressure after the system has been charged by the low pressure cylinders. Provision is also made to automatically cut out the low pressure cylinder and also relieve the low pressure cylinder of back pressure. so that all the pressure applied to the pedal may be used to operate the high pressure piston to apply the brakes.

To relieve the low pressure piston of back pressure, I employ a duct to connect the low pressure cylinder with the reservoir, said duct being normally closed, but which is automatically opened, and through which the liquid may be discharged from the low pressure cylinder, after the piston in said cylinder has moved a predetermined distance; the movement of said piston being effective to establish communication between said cylinder and said duct or, in other words, open the duct so that the liquid may be forced out of the low pressure cylinder back into the reservoir by the low pressure piston. Both low pressure and high pressure cylinders of the pump are effective to charge the brake operating mechanism to take up the slack and also supply pressure for moderate braking during the initial part of the movement of the pump operating pedal until the return duct to the reservoir is open, thereby rendering the low pressure cylinder ineffective or relieving it against back pressure. The high pressure cylinder becomes subsequently effective to apply heavy pressure to the brake. Should the system become charged before the discharge duct is opened, the surplus liquid may be forced back into the reservoir against the action of a suitably arranged relief valve.

In this arrangement, check valves are employed that prevent release of pressure from the brake cylinders until the pedal has returned to normal. So the operator can relax pressure, yet keep the brakes applied so long as he holds the pedal from complete return. Moreover, it permits making a succession of short strokes, drawing more liquid from the reservoir and driving it into the brake cylinder to pile up very high pressure for sudden stops or other emergency conditions.

I have made provision to discharge the brake operating means after the complete return of the pedal to normal. To this end, I provide an auxiliary duct controlled by the pump piston and through which the surplus liquid is returned from the brake operating means to the reservoir.

Other features and advantages will hereafter appear.

It will be understood that although certain embodiments of the device are shown and described herein, changes in the form, arrangements, proportions, sizes and details thereof may be made without departing from the scope of the invention and that the illustrations are merely diagrammatical.

In the accompanying drawing, which forms part of the specification, the figure is a diagrammatic view showing one embodiment of the invention.

In the form of the invention illustrated in this figure, a pump 5a includes a low pressure cylinder 6a of comparatively large volume and a high pressure cylinder 7a of comparatively small volume, the cylinders 6a and 7a are arranged in alignment and they are provided with pistons 8a and 9a respectively, said pistons being connected to a piston rod 10a, which rod may be operated directly by an operating member or pedal 11a or through the medium of a lever, not shown, which may be interposed between the rod 10a and the pedal 11a. Each piston may normally be at one end of its cylinder and may be pushed inwardly in their respective cylinders by the actuation of the pedal 11a, against the action of a return spring 12a, to force liquid through ducts 13a and 14a and thence into ducts or branches 21a, each branch connecting with a brake operating cylinder 22 so that the liquid may be forced into said cylinder to move a piston upwardly therein. The piston may be connected through a link 24 to a crank arm 25 to rock a shaft 26 which rock shaft may be provided at its end with a cam 27 to spread internal brake shoes 28 against the action of a spring 29, said brake shoes being swung about a pivot 30 and against the inner surface of a brake drum 31 which may be secured to the wheel of a vehicle or any other rotating element to arrest it.

The cylinder 6a is connected to the reservoir 39a through a duct 50 and a check valve 51. During approximately the first third of the stroke of the pedal 11a, liquid is delivered to the brake cylinder 22 from the cylinders 6a and 7a through ducts 13a and 14a respectively, and through the ducts 21a; sufficient liquid being delivered to the braking system, during this portion of the stroke of the pedal, to take up all slack. Thereupon, the pressure in the low pressure cylinder 6a will rise to a point, (say, 20 pounds to the square inch) where a relief valve 51 will open against the pressure of its spring, allowing the surplus oil from the cylinder 6a to discharge through the duct 50, branch 52, chamber 53, relief valve 51, chamber 54 and through aperture 55 into the reservoir 39a.

One or more slots 51' may be cut in the valve seat or in the valve head of relief valve 51, to assist in relieving the pressure against the piston 8a upon long application of the brakes without causing serious escape of oil during the early low pressure application.

The slight additional pressure on the pedal to overcome the resistance of the relief valve 51, upon the initial application of the brakes, and until pressure in the low pressure cylinder 6a has been reduced by escape of oil through the slot in seat of the relief valve 51 is effective to check the tendency of most drivers to apply the brakes too suddenly under normal conditions of driving.

After the brake system has become charged and when the pressure in the brake cylinders 22 reaches a point above that of the relief valve 51, the oil in each brake cylinder tends to flow back through duct 13a to the low pressure cylinder 6a, thus closing a check valve 56, connected in duct 13a, and thus preventing the return of the liquid from the brake cylinder 22.

When the high pressure cylinder 7a and its associated piston 9a become effective to apply the high pressure to the charged braking system, it is desirable to completely relieve the low pressure piston 8a of back pressure. To this end there may be provided, in the high pressure piston 9a, which may extend back to the low pressure piston 8a, a groove 57 which connects a port 58 with the low pressure cylinder 6a so that the liquid may be discharged from said low pressure cylinder through the groove 57 through the port 58 and through a return duct 59 and into the reservoir 39a; said port 58 is closed by the high pressure piston 9a during the early part of the operation of the pump. Thus back pressure against the low pressure piston 8a is relieved and the entire effort upon the pedal 8a is utilized to increase the pressure in the cylinder 7a and consequently in the brake cylinders 22 to apply the brakes.

When it is desired to release the brakes, pressure is removed from the pedal 11a and the return spring 12a restores the pistons 8a and 9a to normal. When the piston 9a returns to normal it uncovers a port 63 so that the liquid may be discharged from the brake cylinders 22 through the ducts 21a, duct 13a and duct 64 through the port 63 and into the high pressure cylinder 7a, the surplus liquid being allowed to return from the high pressure cylinder to the reservoir 39, through the port 58 and return duct 59.

This system has certain advantages due to the fact that the check valves 56, 62 automatically lock return flow of liquid from the brake cylinder 22, until the foot pedal has made a complete return to normal so as to uncover port 63. During the return stroke of the foot pedal, check valve 61, which controls the flow of liquid through a duct connecting the return duct 59 with the duct 14a between the check valve 62 and the high pressure cylinder 7a, opens to permit indrawing of liquid from the reservoir 39a. One advantage most appreciated by the operator is that after he has set the brakes, he does not have to maintain pressure on the pedal in order to keep them set. He can let the pedal return to an intermediate position, merely holding it against the pressure of spring 12a, instead of straining to keep up pressure on the pedal at the extreme end of its down stroke.

A further advantage is that he can use the piston as a reciprocating pump, making as many short strokes as may be desired, so long as he does not uncover port 63. On the return part of such short stroke, valves 56 and 62 remain closed while valve 61 opens to permit indrawing of additional liquid from the reservoir; then the out-portion of such stroke causes 61 to close and 62 to open, and the liquid will be forced through to the brake cylinder. If the back strokes are longer than the length of slot 57, the larger pump cylinder 6a will also come into operation in the same way.

This pumping action can be employed either to replenish the braking system in case there has been a leak of liquid, as may result from loose valves or joints or from the use of a loose piston or a piston without any packing, such as is indicated in the drawings. Moreover, it is useful where only one piston, 6a, is used, the piston 5a, groove 57, inlet and outlet 13a being omitted.

Another important advantage is pumping to pile up pressure in the brake cylinder far above normal. As before explained, the pump piston has to be of small diameter and volume in order to secure sufficient pressure per square inch on the braking cylinder and as the length of the cylinder is necessarily limited, the pressure that can be applied by a single full stroke, even when the system is fully charged with liquid, is correspondingly limited. While practical permissible dimensions permit satisfactory braking of an average automobile by partial actuation of the pedal 11a, it may be found that on large trucks and buses, a full stroke of the pedal pump will be required to charge the system, take up slack, and set the brakes, leaving little or no available travel of the pedal for holding the brakes on long descents or for emergency high pressure applications. In such case, the operator may force a full down stroke of the pedal to take up slack and establish a pressure of, say, 300 pounds per square inch. Whenever this pressure, regardless of its amount, is insufficient, the operator simply pumps short strokes at the extreme end of the pedal position and in this way may run up a much higher pressure, say, 600 pounds per square inch, by a final push of, say, 150 pounds on the pedal. So under normal conditions, the driver will simply actuate the pedal in the usual manner, applying just enough pressure to cause the desired braking effect, and may relax without releasing it, but in anticipation of a sudden stop he will actuate the pedal completely, then relax for a new hold on a further supply of oil which he is then ready to drive into the brake cylinders at pressure high enough to lock the wheels, the complete operation requiring but a fraction of a second.

On a long grade, slow repeated pumping of the pedal may be kept up to maintain the brake cylinders at the desired pressure, the pedal being in the meantime in an intermediate position where the leg of the driver is in best position for a sudden application of the brakes under high pressure.

Such braking system gives a driver more confidence since he knows that the system is charged after the first actuation of the pedal, and that with the pedal well back and ample reserve travel, he can apply the brakes under high pressure, from a comfortable position, at any instant. Brake drum expansion due to heating resulting from long application, and leakage of the liquid under pressure, should there be any, are readily compensated for by repeated actuations of the pedal.

In existing braking systems, there is employed a combined reservoir and hand pump, the pump including a screw to screw down a piston to force more oil into the system in order to drive out all air and to follow up wear of the brake shoes to keep the pedal from striking the floor of the automobile, in other words, such system's oil is added manually from time to time as the brakes wear or as the oil leaks out of the system, the oil never returning to the reservoir.

It will be understood that with my invention, the above mentioned adjustment to take up wear of the brake shoes is entirely eliminated since the system is automatically replenished or kept charged; the liquid flowing continually from and to the reservoir.

A breather hole, 48, may be provided in the upper portion of cylinder 6a, to permit free in and out breathing of air behind piston 8a, as well as expulsion of any oil that may leak by the piston.

I claim:

1. A fluid braking system, including a brake; fluid operated means to actuate said brake; pumping means including a low pressure cylinder, a high pressure cylinder, corresponding pistons and means for operating said pistons; connections between said cylinders and the brake actuating means to supply fluid thereto; a reservoir; means to cut out the low pressure cylinder after partial operation of the brake actuating means while the high pressure cylinder remains in operation; one of said cylinders having a port; a duct connecting said port with the reservoir; and means including a groove in one of said pistons for establishing communication between the low pressure cylinder and said port to permit liquid to flow from the low pressure cylinder to said port and thence to the reservoir.

2. A hydraulic braking system, including a brake operating cylinder; a pump having a low pressure cylinder, a high pressure cylinder, corresponding pistons, and means for actuating said pistons; two ducts, one connecting the low pressure cylinder with the brake operating cylinder and the other connecting the high pressure cylinder with the brake operating cylinder; a reservoir connected to the low pressure cylinder, means including a relief valve to enab'e the discharge of the liquid from low pressure cylinder to the reservoir; means associated with the low pressure duct to prevent return of the liquid from the brake operating cylinder to the low pressure cylinder; means associated with the high pressure duct to prevent return of the liquid from the brake operating cylinder to the high pressure cylinder; means connecting the reservoir and the high pressure cylinder to refill this cylinder upon any return movement of the corresponding piston; and a return duct through which the liquid may be discharged from the brake operating cylinder into the pump, one of said pistons being effective to close said return duct to prevent discharge into the pump while the pump is operated.

3. A hydraulic system, including a brake operating cylinder; a pump having a low pressure cylinder; a high pressure cylinder, corresponding pistons, and means for actuating said pistons; two ducts, one connecting the low pressure cylinder with the brake operating cylinder and the other connecting the high pressure cylinder with the brake operating cylinder; a reservoir connected to the low pressure cylinder, means including a relief valve to enable the discharge of the liquid from the low pressure cylinder to the reservoir; means associated with the low pressure duct to prevent return of the liquid from the brake operating cylinder to the low pressure cylinder; means associated with the high pressure duct to prevent return of the liquid from the brake operating cylinder to the high pressure cylinder; means connecting the reservoir and the high pressure cylinder to refill this cylinder upon any return movement of the corresponding piston; a return duct through which the liquid may be discharged from the brake operating cylinder into the pump; a second return duct to conduct liquid from the high pressure cylinder to the reservoir, and means including the piston of the high pressure cylinder for keeping said return ducts closed when such piston is away from its normal position and open when this piston is in normal position.

4. A hydraulic braking system, including a pump having a low pressure cylinder, a high pressure cylinder, corresponding pistons in said cylinders, and means for operating said pistons; a brake operating cylinder; two ducts, one connecting the low pressure cylinder with the brake operating cylinder and the other connecting the high pressure cylinder with the brake operating cylinder; a reservoir connected to the low pressure cylinder; a relief valve to permit the discharge of liquid from the low pressure cylinder to the reservoir; a check valve in the duct connecting the low pressure cylinder with the brake operating cylinder to prevent return of the liquid from the brake operating cylinder when the pressure in the brake operating cylinder becomes greater than the pressure required to open the relief valve, so that higher pressures can be built up in said brake operating cylinder upon further advance of the high pressure piston; a check valve in the duct connecting the high pressure cylinder with the brake operating cylinder to prevent return of liquid from the brake operating cylinder to the high pressure cylinder; and means rendered effective by return of said pistons to normal positions to relieve the pressure in the brake operating cylinder.

5. A hydraulic braking system, including a pump having a low pressure cylinder, a high pressure cylinder, corresponding pistons in said cylinders, and means for operating said pistons; a brake operating cylinder; two ducts, one connecting the low pressure cylinder with the brake operating cylinder and the other connecting the high pressure cylinder with the brake operating cylinder; a reservoir connected to the low pressure cylinder; a relief valve to permit the discharge of liquid from the low pressure cylinder to the reservoir; a check valve in the duct connecting the low pressure cylinder with the brake operating cylinder to prevent return of the liquid from the brake operating cylinder when the pressure in the brake operating cylinder becomes greater than the pressure required to open the relief valve, so that higher pressures can be built up in said brake operating cylinder upon further advance of the high pressure piston; a check valve in the duct connecting the high pressure cylinder with the brake operating cylinder to prevent return of liquid from the brake operating cylinder to the high pressure cylinder; a fluid conducting connection between said brake operating cylinder and said reservoir; and means controlled by the position of said pistons to close said connection when the pistons are advanced beyond their normal positions and to open the connections when the pistons are restored to their normal positions, thus relieving the pressure in the brake operating cylinder.

6. A hydraulic braking system, including a brake operating cylinder; a pump having a low pressure cylinder, a high pressure cylinder, corresponding pistons and means for advancing and retracting said pistons simultaneously; ducts connecting the pump cylinders with the brake operating cylinder; a reservoir; a duct connected at one end to said reservoir; and means controlled by the position of said pistons whereby this duct will be shut off from the low pressure cylinder and connected with the brake operating cylinder when the pistons are in normal position, will be shut off from both when the pistons are advanced from this position, and will be shut off from the brake operating cylinder and connected with the low pressure cylinder when the pistons are further advanced.

Signed at Plainfield, in the county of Union, and State of New Jersey this 26th day of November, A. D. 1930.

SAMUEL W. RUSHMORE.